Figure 1:
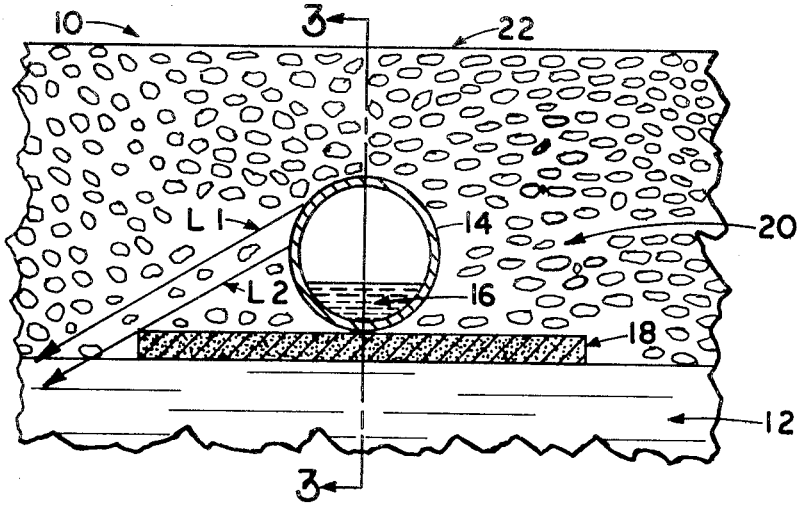
Figure 2:
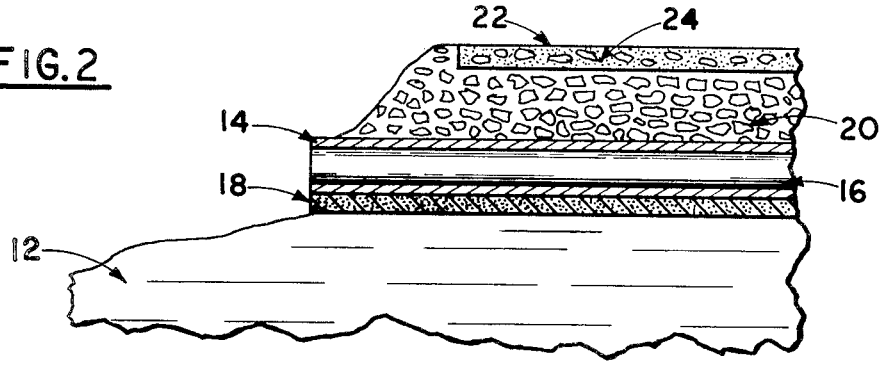
Figure 3:
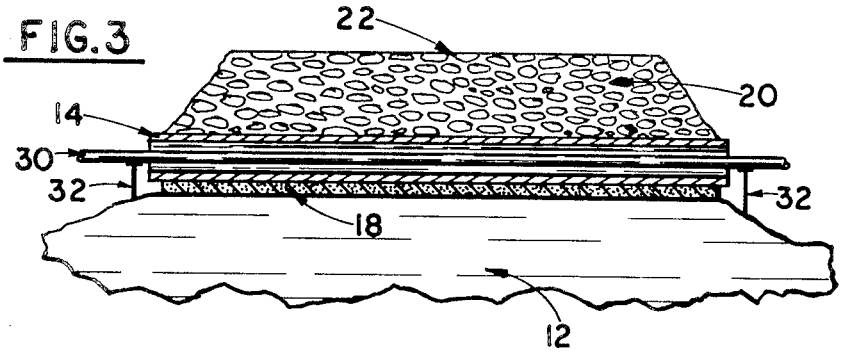

United States Defensive Publication [19] (H) [11] T960,001

Knight [43] July 5, 1977

[54] CULVERT CONSTRUCTION

[76] Inventor: George R. Knight, Box 5-465, College, Alaska 99701

[21] Appl. No.: 676,444

[22] Filed: Apr. 12, 1976

Related U.S. Application Data

[63] Continuation of Ser. No. 577,577, May 15, 1975, abandoned, which is a continuation of Ser. No. 388,291, Aug. 14, 1973, abandoned, which is a continuation-in-part of Ser. No. 186,240, Oct. 4, 1971, abandoned.

[51] Int. Cl.[2] ..... E01F 5/00

[52] U.S. Cl. ..... 61/16; 61/50

[57] ABSTRACT

A culvert construction particularly useful in Arctic regions wherein a permafrost condition typically prevails is provided by a culvert having an insulating base layer between the culvert and the permafrost, preferably wherein the base layer is of greater width than the width of the culvert. Suitable materials for preparing the insulating base layer are synthetic resin foams such as polyurethane and polystyrene. The culvert construction is useful in Arctic regions where a permafrost condition prevails to inhibit culvert sag and culvert icing.

11 Claims, 1 Sheet Drawing,

14 Pages Specification

The file of this unexamined application may be inspected and copies thereof may be purchased (849 O.G. 1221, Apr. 9, 1968).

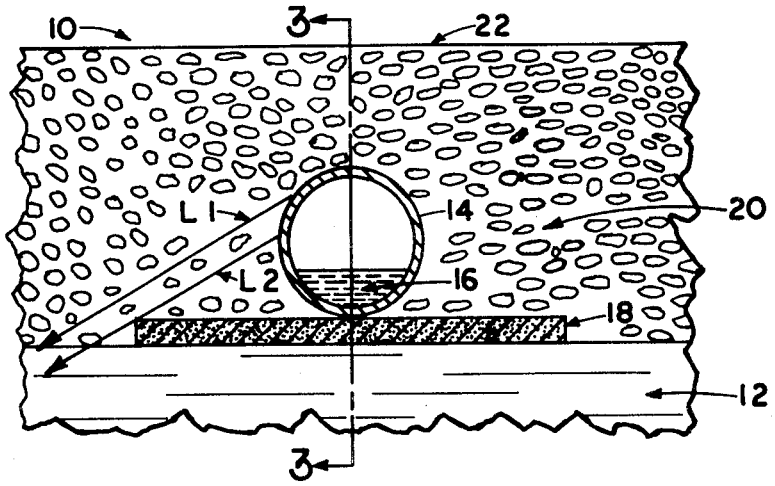

INVENTOR
GEORGE R. KNIGHT

ATTORNEY